United States Patent
Blaner et al.

(10) Patent No.: US 10,884,943 B2
(45) Date of Patent: Jan. 5, 2021

(54) SPECULATIVE CHECKIN OF ERAT CACHE ENTRIES

(71) Applicant: International Business Machines Corporation, Armonk, NY (US)

(72) Inventors: Bartholomew Blaner, Shelburne, VT (US); Jay G. Heaslip, Williston, VT (US); Robert D. Herzl, Windham, NH (US); Jody B. Joyner, Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 16/117,099

(22) Filed: Aug. 30, 2018

(65) Prior Publication Data

US 2020/0073816 A1 Mar. 5, 2020

(51) Int. Cl.
*G06F 12/02* (2006.01)
*G06F 12/0897* (2016.01)
*G06F 12/1009* (2016.01)

(52) U.S. Cl.
CPC ........ *G06F 12/0897* (2013.01); *G06F 12/023* (2013.01); *G06F 12/1009* (2013.01); *G06F 2212/507* (2013.01); *G06F 2212/657* (2013.01)

(58) Field of Classification Search
CPC combination set(s) only.
See application file for complete search history.

(56) References Cited

U.S. PATENT DOCUMENTS

| | | | |
|---|---|---|---|
| 7,386,669 B2 | 6/2008 | Dombrowski et al. |
| 8,412,911 B2 | 4/2013 | Grohoski et al. |
| 9,465,744 B2 | 10/2016 | Dale et al. |
| 10,606,762 B2 | 3/2020 | Helms et al. |
| 2005/0182912 A1 | 8/2005 | DeMent et al. |
| 2016/0179694 A1 | 6/2016 | Blaner et al. |

*Primary Examiner* — Yong J Choe
(74) *Attorney, Agent, or Firm* — Scully, Scott, Murphy & Presser, P.C.

(57) ABSTRACT

A method, computer program product, and a computer system are disclosed for processing information in a processor that in one or more embodiments includes setting a threshold number of free Effective to Real Address Translation (ERAT) cache entries in an ERAT cache; determining whether a total number of free ERAT cache entries is less than or equal to the threshold number of free ERAT cache entries; allocating, in response to determining that the total number of free entries is less than or equal to the threshold number, one or more active ERAT cache entries to be speculatively checked in to a memory management unit (MMU); and speculatively checking in the one or more active ERAT cache entries to the MMU.

20 Claims, 3 Drawing Sheets

SPECULATIVE CHECKIN OF ERAT CACHE ENTRIES

BACKGROUND

The disclosure herein relates generally to data processing, and more particularly, to methods, apparatus, and products for speculatively checking in Effective to Real Address Translation (ERAT) cache entries in a computer system.

Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices increases, the need for more efficient computer processors also increases. Speed of operation and power consumption are at least two areas of computer processor technology that affect efficiency of computer processors.

A processor may use conventional effective address (i.e., virtual address) to real address (i.e., physical address) translation techniques to improve computer processor efficiency. For instance, when the processor receives an effective address, the address is typically translated via a tablewalk process that translates the address using table lookups. The tables are present in memory and are typically defined by an operating system or a hypervisor. To avoid performing the tablewalk process for each received effective address, small caches of recently translated addresses are kept locally with the units or cores of the processor. For example, a translation lookaside buffer ("TLB") may be located on a memory management unit ("MMU") or an ERAT cache may be located on an accelerator unit ("AU") on a processor.

When a translated address is not located in the ERAT cache, the ERAT cache requests a new effective address to real address translation from the MMU by sending a checkout request to the MMU. However, in situations in which all of the entries in the ERAT cache are in use, one of the entries must be evicted from the ERAT cache before an entry containing the new translation can be added to the ERAT cache. Typically, latency can occur when the system and/or processor has to perform translations, including the latency incurred from evicting entries from the ERAT cache.

SUMMARY

The summary of the disclosure is given to aid understanding of a computer system, computer architectural structure, processor, and method of speculatively checking in ERAT cache entries in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

According to one or more embodiments of the present disclosure, a method of processing information in a processor of a computer system includes setting a threshold number of free ERAT cache entries in an ERAT cache. The method in an embodiment further includes determining whether a total number of free ERAT cache entries is less than or equal to the threshold number of free ERAT cache entries. The method in an embodiment includes allocating, in response to determining that the total number of free ERAT cache entries is less than or equal to the threshold number of ERAT cache entries, one or more active ERAT cache entries to be speculatively checked in to the MMU. The method may also include speculatively checking in the one or more active ERAT cache entries to the MMU.

According to one or more embodiments, a computer program product is disclosed that includes a non-transitory computer-readable storage medium having program instructions embodied therewith, the program instructions executable by one or more processors. The program instructions in an embodiment includes setting a threshold number of free ERAT cache entries in an ERAT cache. The program instructions, in an aspect, includes determining whether a total number of free ERAT cache entries is less than or equal to the threshold number of free ERAT cache entries. The program instructions, in an aspect, includes allocating, in response to determining that the total number of free ERAT cache entries is less than or equal to the threshold number of free ERAT cache entries, one or more active ERAT cache entries to be speculatively checked in to the MMU, and in an aspect, speculatively checking in the one or more active ERAT cache entries to the MMU.

According to one or more embodiments, an information handling system is disclosed that includes one or more processors having one or more acceleration units and one or more MMU units wherein at least one acceleration unit has an ERAT cache having a plurality of entries. The processor is configured and adapted to set a threshold number of free ERAT cache entries in the ERAT cache. The processor is configured and adapted to determine whether a total number of free ERAT cache entries is less than or equal to the threshold number of free ERAT cache entries. The processor is configured and adapted to allocate, in response to determining that the total number of free ERAT cache entries is less than or equal to the threshold number of free ERAT cache entries, one or more active ERAT cache entries to be speculatively checked in to the MMU. The processor in an aspect is configured and adapted to speculatively checking in the one or more active ERAT cache entries to the MMU.

The embodiments of the present disclosure reduce the latency incurred in effective address ("EA") to real address ("RA") translations, thus increasing processor performance and efficiency. Moreover, the embodiments reduce the latency incurred by speculatively checking in one or more ERAT cache entries in a computer system having a distributed MMU. By eliminating the need to precede checkout requests with a check in request/response transaction, the latency in such check in transaction is avoided, the latency incurred in the checkout transactions is reduced, and the performance and speed at which one or more processors operate is increased.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, systems, embodiments, or devices shown, and the arrangements, structures, subassemblies, features, aspects, methods, processes, embodiments, and devices shown may be used singularly or in combination with other arrangements, structures, assemblies, subassemblies, systems, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information processing systems, including processors and microprocessor systems and architectures, which are apparent to those skilled in the art. It is assumed that those skilled in the art are familiar with the general architecture of processors, and in particular with processors which operate in an out-of-order execution fashion. It may be noted that a numbered element is numbered according to the figure in which the element is introduced, and is typically referred to by that number throughout succeeding figures.

Exemplary methods, apparatus, and products for performing EA to RA translations, and in particular for speculatively checking in ERAT cache entries in a computer system in accordance with the present disclosure are described further below with reference to the Figures.

Figure 1:
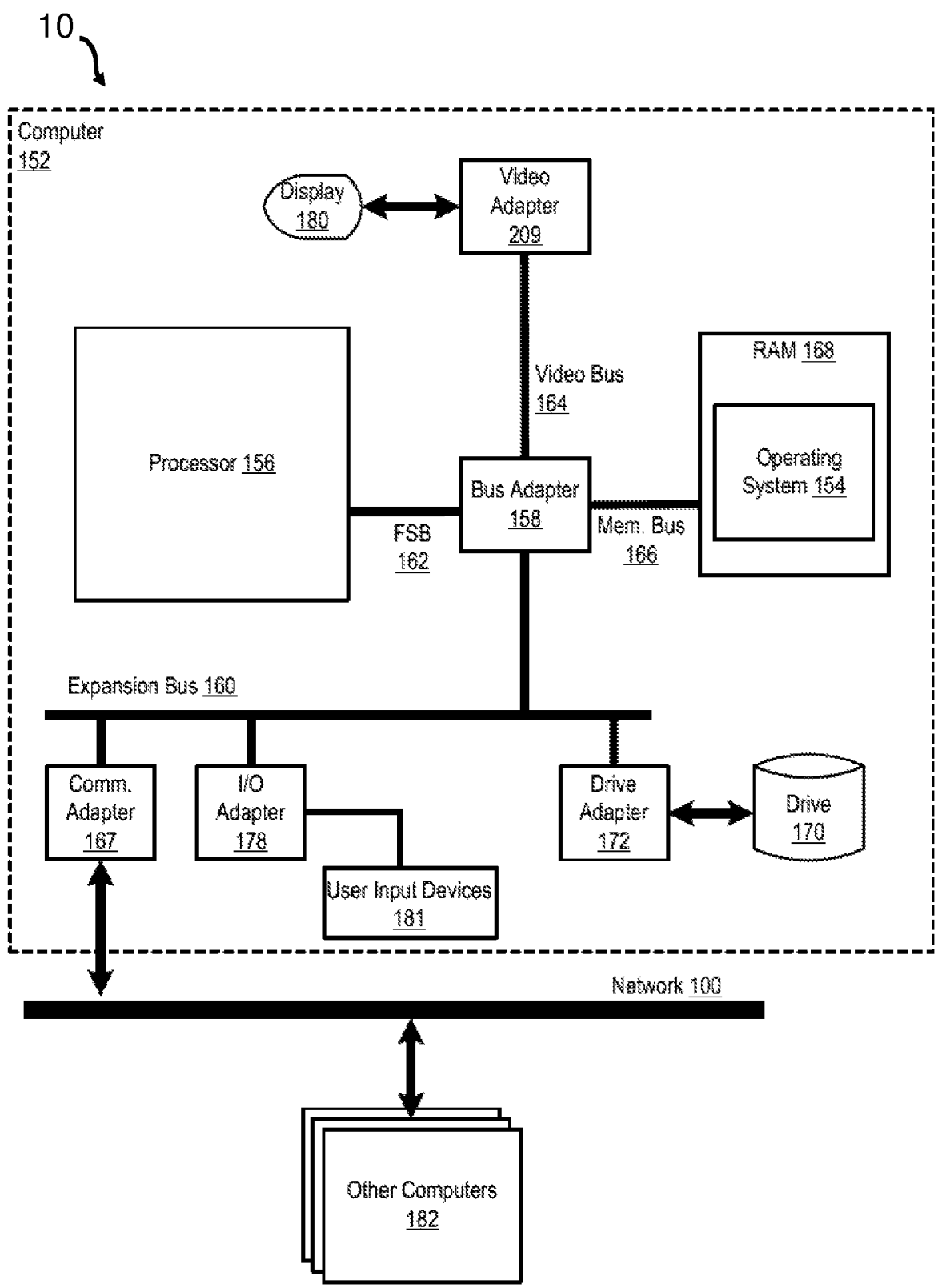
FIG. 1 is a functional block diagram illustrating a computer system, according to embodiments of the present disclosure.

FIG. 1 is a functional block diagram illustrating a computer system 10. The system 10 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152. In some embodiments, RAM 168 may be an embedded dynamic random access memory (eDRAM). In some embodiments, RAM 168 may be utilized by accelerator units and other units, such as processing cores, on the processor 156, via communication fabric 204. The RAM 168 may receive information and messages from a memory management unit ("MMU"), such as MMU 206, including table walk data requests and page table entry updates.

The processor 156 may be implemented as a multi-slice processor. The term "multi-slice" may refer to a processor having a plurality of similar or identical sets of components, in which each set of components may operate independently of all the other sets or in concert with the one or more of the other sets.

Although the processor 156 is shown to be coupled to RAM 168 through the front side bus 162, the bus adapter 158, and the high speed memory bus 166, those of ordinary skill in the art will recognize that such configuration is only an example implementation and other configurations of coupling the processor 156 to other components of the system 10 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 and the data processing application 102 being located in RAM 168, other components of such software may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 100. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

Figure 2:
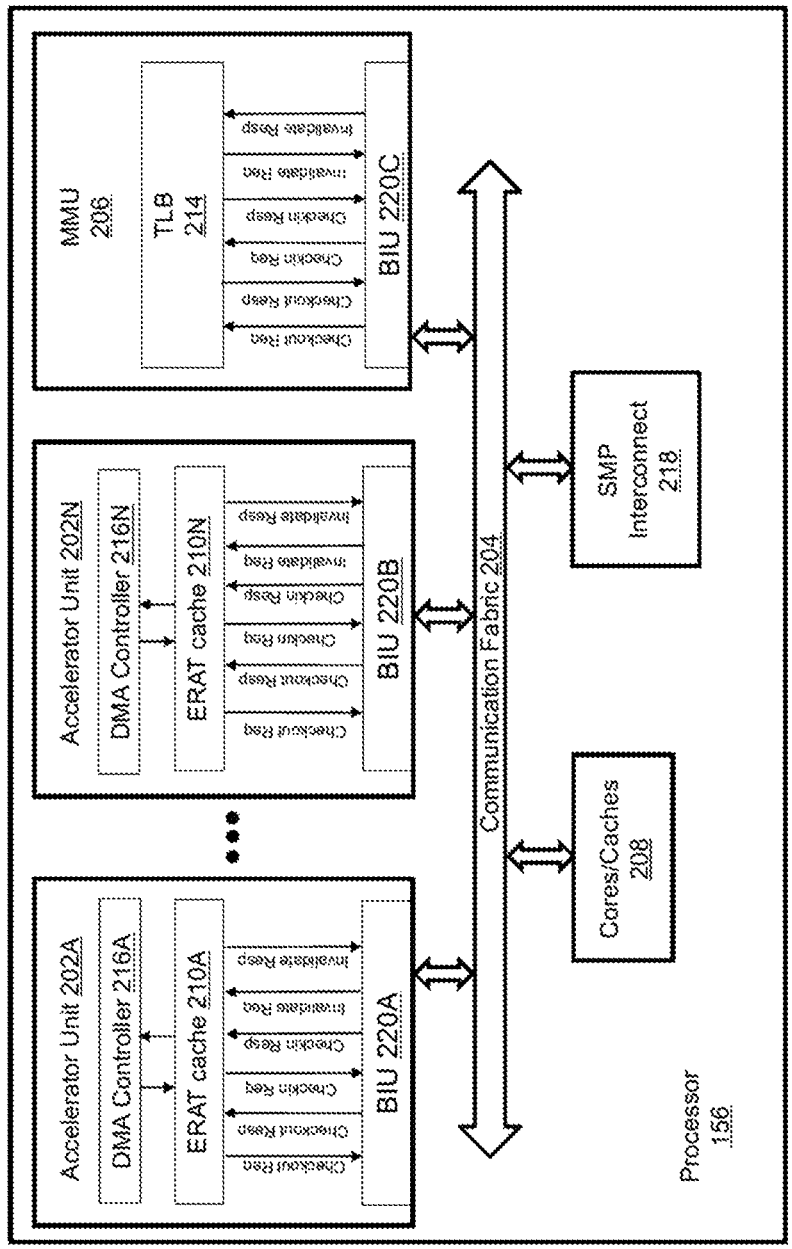
FIG. 2 is a functional block diagram illustrating a processor configured to perform EA to RA translations, according to embodiments of the present disclosure.

FIG. 2 is a functional block diagram illustrating the processor 156 configured to perform EA to RA translations, and in particular to practice embodiments of the disclosure that decrease latency in processors, including decreasing latency in performing operations that involve EA to RA translations. Processor 156 may include multiple units, such as, one or more AUs, e.g., AU 202A and AU 202N, a distributed MMU 206, a symmetric multiprocessing ("SMP") interconnect 218, and core/caches 208, each being coupled to a communications fabric 204, which is configured to transmit messages between the units, connectors, and storage on processor 156. AU 202A and AU 202N include direct memory access ("DMA") Controller 216A and ERAT cache 210A and DMA Controller 216N and ERAT cache 210N, respectively. The MMU 206 may be a distributed MMU connected to one or more AUs. The MMU 206 may include a segment lookaside buffer ("SLB"), a translation lookaside buffer ("TLB") (214), and/or an in use scoreboard ("IUSB"). The SMP interconnect 218 allows additional processors to be connected to processor 156, thus increasing computational power. The SMP 218 interconnect may connect processor 156 to other processors via a different network connection, which includes a higher bandwidth, lower latency and in which cache coherence traffic and data traffic flow over the different network connection.

The DMA controller 216A and DMA Controller 216N may each make requests to an ERAT on behalf of the respective AU. That is, the DMA controller 216A may perform memory moves on behalf of AU 202A, and DMA controller 216N may perform memory moves on behalf of AU 202N. DMA controller 216A and DMA controller 216N may each have a source address for input data and a target address for output data from the respective AUs and ERAT caches.

In some embodiments, AU 202A, AU 202N, MMU 206, core caches 208, and communications fabric 204 may be implemented on the same semiconducting die or on multiple interconnected dies. In some embodiments, processor 156 may include multiple accelerator units, such as AU 202A and AU 202N, in which each accelerator unit interacts with MMU 206. In other embodiments, processor 156 may include only one accelerator unit. For purpose of clarity, the paragraphs below discuss the embodiments of the disclosure in view of AU 202A, DMA Controller 216A, and ERAT cache 210A. However, this discussion is not intended to be limiting or restrictive to only the features of AU 202A, DMA Controller 216A, and ERAT cache 210A; but rather, all or some features of AU 202A may be equally applicable in other accelerator units, such as AU 202N, all or some features of DMA Controller 216A may be equally applicable in other DMA controllers, such as DMA Controller 216N, and all or some features of ERAT cache 210A may be equally applicable in other ERAT caches, such as ERAT cache 210N.

AU 202A is configured to provide an interface between external processing elements and the elements within the processor 156, including providing access to locations in RAM 168 on the computer 152, the core caches 208 on processor 156, or other memory locations in or connected to computer 152. In some embodiments, AU 202A may include coherent accelerator processor interfaces, graphic acceleration interfaces, cryptographic interfaces, and streaming interfaces. The AU 202A of processor 156 may be a specialized hardware that can perform specific compute functions, such as encryption, decryption, compression, or decompression.

AU 202A includes ERAT cache 210A to store recently received effective address ("EA") to real address ("RA") translations. The EA is a virtual address used by elements and processes in the computing system 10 to refer to memory locations. The RA is a physical address. During operation of the processor, the EA must be translated into the RA in order for the accelerator unit 202A to access requested data. ERAT cache 210A stores each recent EA to RA translation in an ERAT cache entry. Each entry in the ERAT cache is associated with an ERAT index, which identifies the ERAT cache entry within the ERAT cache 210A. For example, an ERAT index of 4 may refer to the fourth (or fifth) entry in the ERAT cache 210A. A variety of indexing schemes, known to those of ordinary skill in the art, may be used for ERAT indexes.

The ERAT cache 210A, in an aspect, may be a content addressable memory ("CAM") having 32 entries. The ERAT cache 210A may also be configured with more or less than 32 entries. In some aspects, the entries of the ERAT cache 210A may be partitioned into 8 groups of 4 entries each. In other aspects, the entries may also be partitioned into a different number of groups with the same or a different number of entries per group. In an embodiment, one or more entries in the ERAT cache may be empty or free, e.g., available to receive an EA to RA translation.

The MMU 206 is a unit on processor 156 that translates EAs into RAs. The MMU 206 may perform a table walk or other procedures, such as a TLB lookup, to obtain a translation for a given EA, and may store previous translations in lookaside buffers, such as TLB 214. The TLB 214 may be a cache of virtual addresses mapped to real addresses stored in page table entries, i.e., TLB entries, in TLB 214. Each page table entry ("PTE") entry may be associated with a TLB index, which identifies the TLB or PTE entry within the TLB. For example, a TLB index of 4 may refer to the forth (or fifth) entry in the TLB. A variety of indexing schemes, known to those of ordinary skill in the art, may be used for TLB indexes. Some translations may utilize the TLB 214 without utilizing an SLB. For example, a radix translation may use two entries in the TLB 214 (e.g., a guest and host) instead of utilizing the SLB.

The SLB (not shown) may be a cache of effective segment identifiers (ESID) mapped to virtual segment identifiers (VSID) stored in SLB entries. In hash page table translations, a portion of the EA, referred to as the ESID, is used to obtain a VSID, and a combination of the EA and VSID are used to determine a virtual address. Each SLB entry is associated with an SLB index, which identifies the SLB entry within the SLB. For example, a SLB index of 4 may refer to the forth (or fifth) entry in the SLB. A variety of indexing schemes, known to those of ordinary skill in the art, may be used for SLB indexes.

The IUSB (not shown) may be a data structure that stores ERAT indexes mapped to TLB indexes and, if applicable, SLB indexes. The IUSB may map TLB indexes and SLB indexes to ERAT indexes that identify entries in the ERAT cache. The IUSB tracks which entries in the SLB and the TLB store translations that have been utilized to generate translations are currently stored in ERAT caches. Specifically, the IUSB indicates, for a given ERAT index, which TLB and SLB entries (identified by TLB indexes and SLB indexes) were used to generate the translation stored in the ERAT cache entry identified by the ERAT index.

The communication fabric 204 may be any type of communication fabric known to one of ordinary skill in the art that allows communication between the various units, memory, and interconnects in processor 156. The communication fabric 204 may also be an out-of-order on-chip bus, in which the transactions (e.g., checkin request/response and checkout request/response) are transmitted as packets on the out-of-order on-chip bus. Further, the transactions (e.g., checkin request/response and checkout request/response) may arrive at either or both the MMU and AUs in an arbitrary order. The MMU and AUs are coupled to the communication fabric 204 via their respective Bus Interface Units ("BIU"), such as BIU 220A, 220B, and 220C.

In one or more embodiments, the core/caches 208 may include the processor cores and their level one ("L1"), level two ("L2"), and/or last level cache ("LLC") on processor 156. The L1, L2, and LLC may be arranged in an arbitrary configuration, such a split Instruction & Data L1, shared L2 private L2, etc.

During operations, the system may need to make translations between effective (i.e., virtual) addresses and real addresses. As indicated above, the MMU 206 may provide EA to RA translations and send the translations to the ERAT cache 210A, in which the translations are stored for use in ERAT cache entries. For example, in an operation, the DMA controller 216A, on behalf of the AU 202A, may receive one or more requests (e.g. a read request to compress a page or a write request to write compression results of a page), in which the request may require an EA to RA translation to perform the request. When the AU 202A needs a translation of an EA to perform the request, the DMA controller 216A, on behalf of the AU 202A, passes the request to the ERAT cache 210A to determine whether the ERAT cache 210A has the translation in an entry of the ERAT cache 210A. The ERAT cache in an embodiment performs a lookup, e.g., the ERAT cache is searched, to see if the translation is already located in an entry in the ERAT cache. If the translation is located in an entry of the ERAT cache 210A, the ERAT cache 210A provides the translation to the AU 202A. If the ERAT cache 210A does not have the requested translation, the ERAT cache 210A requests an EA to RA translation (i.e., an ERAT) from the MMU 206 by sending a checkout request to the MMU 206, via BIU 220A, communication fabric 204, and BIU 220C. The MMU 206 receives the checkout request requesting the EA to RA translation, and generates the translation by performing a TLB lookup by searching the TLB 214 for the page table entry ("PTE") of the EA or performing a tablewalk. The MMU 206 may also mark the PTE, which includes the translation, in TLB 214 as being InUse. The MMU 206 sends the translation via the MMU checkout response, BIU 220c, communication fabric 204, and BIU 220A, to the ERAT cache 210A. The ERAT cache 210A receives the checkout response, which may contain the checkout request status and the translation, from the MMU 206. Having received the checkout response that includes the translation, the ERAT cache 210A creates an entry in the ERAT cache 210A that includes the translation and provides the translation to the AU 202A.

In various embodiments, the MMU 206 may be inclusive of the ERAT caches in the accelerator units, in that each translation cached in the ERAT caches may also be stored within the lookaside buffers on the MMU 206 such that each ERAT cache entry in the ERAT cache has a corresponding PTE stored in the TLB 214. This TLB entry may be marked as InUse when there is a corresponding ERAT cache entry. As the MMU 206 is inclusive of the ERAT cache 210A, the ERAT cache cannot silently evict an entry in the ERAT cache 210A when there is a request for a new translation without informing the MMU 206 because doing so would cause the MMU 206 and ERAT cache 210A to be out of sync. Thus, in conventional systems, a checkin request and checkin response transaction for the entry in the ERAT cache 210A may be necessary between the ERAT cache 210A and MMU 206. That is, for the ERAT cache 210A to evict an entry, the ERAT cache 210A may issue a checkin request of the ERAT cache entry to the MMU 206. The MMU 206 checks in the entry and issues a checkin response to the AU 202A to acknowledge that the entry in the ERAT cache 210A is no longer in use. In some embodiments, the MMU 206 maintains the status of the ERAT cache entries, e.g., whether or not the entries are InUse, in the MMU 206 scoreboard.

When the MMU 206 wants to remove an entry from the ERAT cache 210A, the MMU may invalidate an InUse entry. To invalidate an InUse entry, the MMU 206 sends an invalidate request to the ERAT cache 210A of the AU 202A. When the invalidation of the entry is complete, the ERAT cache 210A sends an invalidate response to the MMU 206. In some embodiments, when the ERAT cache 210A removes or evicts an ERAT cache entry from ERAT cache 210A via a checkin request, i.e., checked into the MMU 206, the MMU 206 removes the corresponding entry, such as the PTE, from the TLB 214 and, if applicable, SLB. When the entry is removed from the TLB 214 or, if applicable, the SLB, the MMU 206 sends a checkin response to the ERAT cache 210A that indicates that the corresponding ERAT entry is no longer 'InUse'.

In an example, the DMA controller 216A, on behalf of the AU 202A, may receive a request (e.g., a write request to write compression results of a page) that requires an EA to RA translation to perform the request. The DMA controller 216A passes the request to the ERAT cache 210A, and the ERAT cache 210A may search its entries to determine whether the translation is in an entry of the ERAT cache, e.g., by performing an ERAT lookup. In the cases in which the ERAT cache 210A does not have the requested translation, the ERAT cache issues a checkout request to the MMU 206 for the requested translation. However, if all of the entries in the ERAT cache 210A are InUse, the ERAT cache 210A must evict an entry via a checkin request/response transaction before the ERAT cache 210A can receive the new requested translation. Thus, in conventional systems, processor 156 incurs latency in performing these checkin and checkout transactions. In particular, the latency incurred for the checkin request/response transaction to evict an entry can range from 15% to 60% (and possibly even higher) of the total latency incurred for checking in an entry and receiving an entry containing a new translation.

Figure 3:
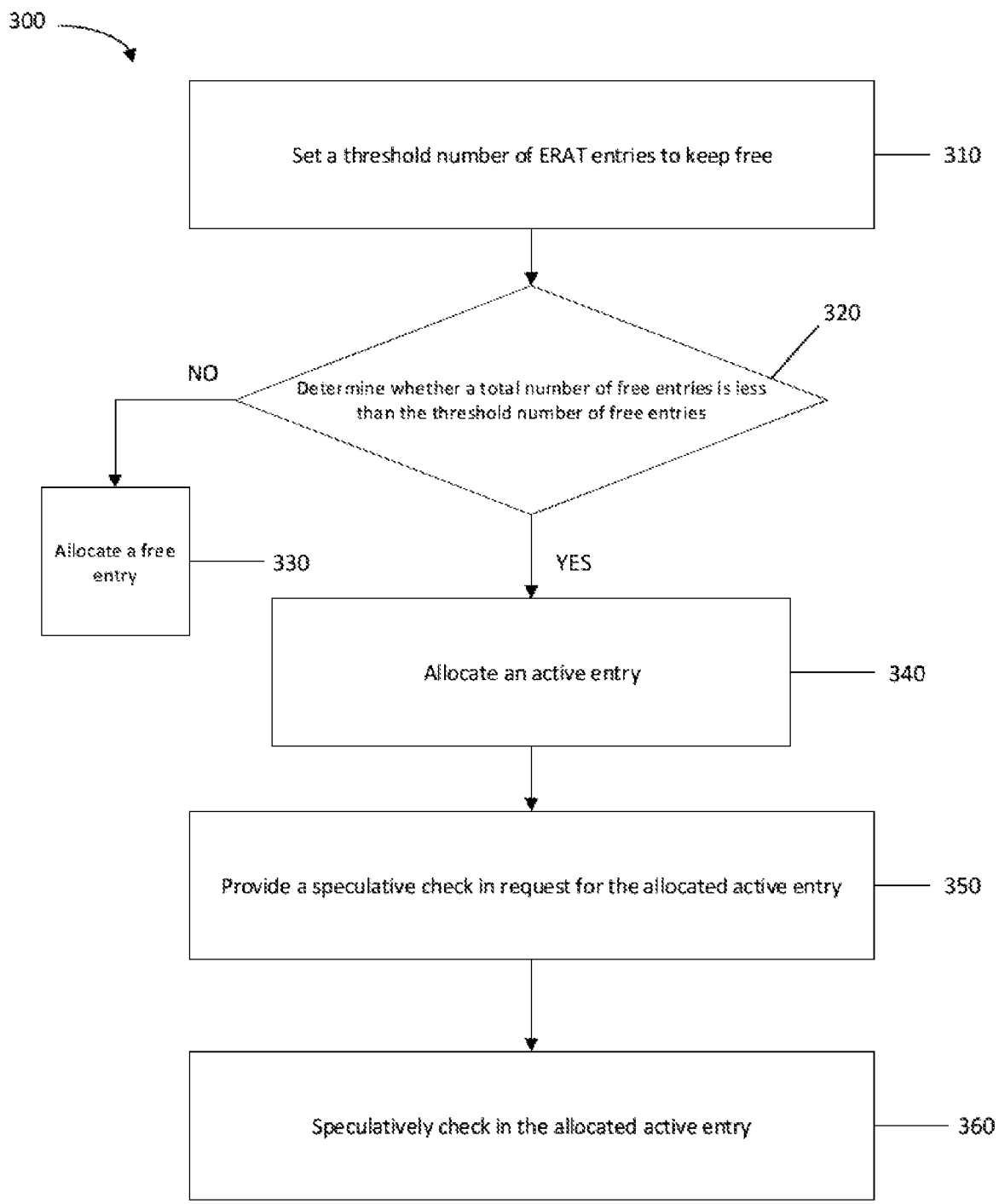
FIG. 3 is a flowchart illustrating a method of increasing the efficiency of a computer system, according to embodiments of the present disclosure.

FIG. 3 is an exemplary flowchart in accordance with various embodiments illustrating and describing a method of increasing the efficiency of a computer system, and more specifically a method of decreasing latency in EA to RA translations in a processor, particularly involving processes that speculatively checkin ERAT cache entries to keep one or more entries of the ERAT cache free or available for a translation. While the method 300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 3, but the process may be integrated and/or one or more steps may be performed together, simultaneously, or the steps may be performed in the order disclosed or in an alternate order.

In some aspects as discussed above, the DMA controller 216A, on behalf of the AU 202A, may receive a request to perform a function to an EA, in which the EA requires a translation to an RA. The DMA controller 216A may pass the request to the ERAT cache 210A, and the ERAT cache 210A may search its entries for an entry containing a translation of the effective address ("EA") to a real address ("RA"). In some embodiments, the ERAT cache 210A may search and locate the entry in the ERAT cache 210A. In other embodiments, if the entry is not located in the ERAT cache 210A, the ERAT cache 210A may provide a checkout request to the MMU 206 requesting an EA to RA translation from the MMU 206. The MMU 206 may receive the checkout request and generate a new translation, via a TLB lookup or a tablewalk process. The MMU 206 sends the requested EA to RA translation to the ERAT cache 210A, via the MMU checkout response. The ERAT cache 210A creates an ERAT cache entry in the ERAT cache 210A that includes the translation and provides the translation to the AU 202A. That is, in various embodiments, the requested EA to RA translation is stored in a free entry (location) in the ERAT cache In various embodiments, all of the method 300 or portions of the method 300 may be performed simultaneous or in parallel with the ERAT cache 210A performing checkout transactions with the MMU 206, at predetermined periods of time, in response to reaching a threshold level of active entries (e.g., 30 active entries), or at any other combination of the aforementioned.

In the ERAT cache 210A, each entry may include a valid bit or an invalid bit. In an embodiment, if the entry in the ERAT cache includes a valid bit, then the entry may be considered active (e.g., InUse). In another embodiment, if the entry in the ERAT cache includes an invalid bit, then the entry may be considered free (e.g., not InUse). In other embodiments, if the entry in the ERAT cache includes a valid bit, then the entry may be considered free, and if the entry in the ERAT cache includes an invalid bit, then the entry may be consider active.

In some embodiments, a threshold number of ERAT entries to keep free is set at 310. In various aspects, the ERAT cache 210A may preferably set the threshold number, which may be a speculative checkin count. For example, the ERAT cache 210A may set the threshold number of entries to keep free in the ERAT cache 210A at 2 entries. In other aspects, the ERAT cache 210A may receive instructions that set the threshold number.

In some embodiments, at 320, a request may be received to allocate an ERAT cache entry or a request for an EA to RA is received. In other embodiments, the ERAT cache 210a may wake up in response to a number of active entries in the ERAT cache being equal to or greater than a predetermined threshold number of active ERAT entries. In response to either of the aforementioned embodiments, a determination at 320 may be made, preferably in some embodiments by the ERAT cache 210A, as to whether a total number of free entries is less than the threshold number of free entries. For example, the ERAT cache 210A may determine whether the total number of free entries is less than or equal to the threshold number of free entries which is set, for purposes of the example, 2 free entries. In various embodiments, the ERAT cache 210A may include a self-contained state machine, which compares the total number of free entries to the threshold number of free entries. The state machine may wake up the ERAT cache 210A in response to a number of active ERAT cache entries in the ERAT cache 210A being equal to or greater than a predetermined threshold number of active ERAT entries (or a number or free entries in ERAT cache 210A being equal to or less than a threshold number of free ERAT entries).

In a case in which the ERAT cache 210A determines that the total number of free entries is not less than or equal to the threshold number of free entries (320:NO), then the ERAT cache 210A allocates a free entry at 330. In some embodiments, the ERAT cache 210A allocates the free entry to receive an ERAT translation. For example, when the ERAT cache 210A determines that the total number of free entries, for example 3, is greater than the threshold number of 2 entries, then the ERAT cache 210A allocates one of the remaining free entries to receive and store a new ERAT translation from the MMU 206.

In a case in which the ERAT cache 210A determines that the total number of free entries is less than or equal to the threshold number of free entries (320:Yes), then the ERAT cache 210A allocates an active entry at 340. In embodiments, the ERAT cache 210A allocates an active entry to be speculatively checked into the MMU 206. For example, when the ERAT cache 210A determines that the total number of free entries (e.g., 2 free entry in total) is less than or equal to the threshold number of 2 entries, then the ERAT cache 210A allocates one of the active entries to be speculatively checked into the MMU 206. Speculatively checking in an active entry may include checking in an active entry independent of the AU 202A receiving a request for a new translation or the ERAT cache 210A issuing a checkout request to the MMU 206 for a new translation.

In various embodiments, the ERAT cache 210A may allocate more than one active entry to be speculatively checked into the MMU 206. In an example, in situations in which the threshold number of entries is 2 and the total number of free entries is 0, then the ERAT cache 210A may allocate two of the active entries to be speculatively checked into the MMU 206. In some embodiments, the ERAT cache 210A may allocate a number of active entries, greater than the threshold number of entries, to be speculatively checked into the MMU 206. In an example, in situations in which the threshold number of entries is 4 and the total number of free entries is 1, the ERAT cache 210A may allocate five of the active entries to be speculatively checked into the MMU 206.

In one or more embodiments, to select the active entry to be allocated, the ERAT cache 210A tracks the entries within each partitioned group of the ERAT cache 210A. For example, the ERAT cache 210A may use a Least Recently Used ("LRU") algorithm, e.g., the least used entries, or a random algorithm to select one or more active entries that is to be allocated. In an aspect, using a random algorithm, the ERAT cache 210A randomly selects one or more active entries to speculatively checkin. In an aspect using a LRU algorithm, the 32 entries in the ERAT cache 210A may be divided into 8 groups, in which each group has 4 entries. In some aspects, the ERAT cache 210A may iteratively search each group for the LRU entry. For example, a group pointer may point to group 0 as the group to be searched first for the LRU entry, and the ERAT cache 210A may select the LRU entry in group 0 as the active entry to allocate to be speculatively checked in. In a next iteration when it is determined that the total number of free entries is less than or equal to the threshold number of free entries, the ERAT cache 210A may search group 1 for the least recently used entry. This search iteration may continue until group 7, after which the ERAT cache 210A may return to searching group 0 for the LRU entry. In other aspects, the ERAT cache 210A randomly searches each group to select the LRU entry. For example, the ERAT cache 210A may search for the LRU entry in group 5 and select the LRU entry in group 5 as the active entry to speculatively checkin. In the next search, the ERAT cache 210A may search for the LRU entry in group 7, and select the LRU entry in group 7. In yet other aspects, the ERAT cache 210A may search for the LRU entry in all of the active entries. In yet another embodiment, the ERAT cache 210A may search all the groups for the LRU entry or other random entry.

Having allocated the active entry to be speculatively checked in, a speculative checkin request is provided for the allocated active entry at 350. The ERAT cache 210A may provide the speculative checkin request for the allocated active entry to the MMU 206. In response to receiving the speculative checkin request, the allocated active entry is speculatively checked in at 360. For example, the MMU 206 provides a checkin response to the ERAT cache 210A indicating that the allocated active entry is checked in. In one or more embodiments, the MMU 206 may not know the difference from demand request for a translation, e.g., a checkin request, and a speculative checkin request generated by the ERAT cache 210A. In other embodiments, the MMU 206 may distinguish between a checkin request and a speculative checkin request generated by the ERAT cache 210A. The ERAT cache 210A updates the corresponding entry in the ERAT cache 210A by changing the bit in the entry to an invalid bit to indicate that the entry is now free. The speculative checkin request and checkin response transaction preemptively creates free entries in the ERAT cache 210A. In turn, the need for a checkin request/response transaction between the ERAT cache 210A and the MMU 206 to create a free entry to store a new requested translation is eliminated. That is, the ERAT cache 210A may create free entries via a speculative checkin request and checkin response transaction regardless of whether the DMA controller 216A passes a request to the ERAT cache 210A for a translation and a new translation is required from the MMU 206. Eliminating the need for a checkin request/response transaction when an entry in the ERAT cache 210A needs to be allocated decreases latency and increases the efficiency and/or speed of the operation, and/or the processor 156.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 3, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

In one or more embodiments, a method of processing information in a processor of a computer system may include setting a threshold number of free ERAT cache entries in an ERAT cache. The method may include determining whether a total number of free entries is less than or equal to the threshold number of free ERAT cache entries. The method may include allocating, in response to determining that the total number of free entries is less than or equal to the threshold number, one or more active entries to be speculatively checked in to a memory management unit (MMU). The method may also include speculatively checking in the one or more active entries to the MMU.

In one or more embodiments, a computer program product includes a non-transitory computer-readable storage medium having program instructions embodied therewith, the program instructions executable by one or more processors. The program instructions in an embodiment includes setting a threshold number of free Effective to Real Address Translation (ERAT) cache entries in an ERAT cache. The program instructions, in an aspect, includes determining whether a total number of free ERAT cache entries is less than or equal to the threshold number of free ERAT cache entries. The program instructions, in an aspect, includes allocating, in response to determining that the total number of free ERAT cache entries is less than or equal to the threshold number of free ERAT cache entries, one or more active ERAT cache entries to be speculatively checked in to a memory management unit (MMU), and in an aspect, speculatively checking in the one or more active ERAT cache entries to the MMU.

In one or more embodiments, an information handling system includes one or more processors having one or more acceleration units and one or more MMU units wherein at least one acceleration unit has an Effective Address to Real Address Translation (ERAT) cache having a plurality of entries. The processor is configured and adapted to set a threshold number of free ERAT cache entries in the ERAT cache. The processor is configured and adapted to determine whether a total number of free ERAT cache entries is less than or equal to the threshold number of free ERAT cache entries. The processor is configured and adapted to allocate, in response to determining that the total number of free ERAT cache entries is less than or equal to the threshold number of ERAT cache entries, one or more active ERAT cache entries to be speculatively checked in to the memory management unit (MMU). The processor is configured and adapted to speculatively check in the one or more active ERAT cache entries to the MMU.

In one or more embodiments, a computer system includes one or more processors; one or more non-transitory computer-readable storage media; and program instructions, stored on the one or more non-transitory computer-readable storage media, executable by at least one of the one or more processors. In an aspect, the program instructions include setting a threshold number of free ERAT cache entries in the ERAT cache. In an aspect, the program instructions include determining whether a total number of free ERAT cache entries is less than or equal to the threshold number of free ERAT cache entries. In an aspect, the program instructions include allocating, in response to determining that the total number of free ERAT cache entries is less than or equal to the threshold number of free ERAT cache entries, one or more active ERAT cache entries to be speculatively checked in to the one or more MMU. In another aspect, the program instructions include speculatively checking in the one or more active ERAT cache entries to the one or more MMU.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing information in a processor of a computer system, the method comprising:
    setting a threshold number of free Effective to Real Address Translation (ERAT) cache entries in an ERAT cache;
    determining whether a total number of free ERAT cache entries is less than or equal to the threshold number of free ERAT cache entries;
    allocating, in response to determining that the total number of free ERAT cache entries is less than or equal to the threshold number of free ERAT cache entries, one or more active ERAT cache entries to be speculatively checked in to a memory management unit (MMU); and
    speculatively checking in the one or more active ERAT cache entries to the MMU.

2. The method of claim 1, further comprising requesting to allocate an ERAT cache entry in the ERAT cache.

3. The method of claim 1, wherein determining whether a total number of free ERAT cache entries is less than or equal to the threshold number of free ERAT cache entries occurs in response to receiving a request for an Effective Address to Real Address translation.

4. The method of claim 1, wherein determining whether a total number of free ERAT cache entries is less than or equal to the threshold number of free ERAT cache entries occurs in response to a number of active ERAT cache entries being equal to or greater than a predetermined threshold number of active ERAT cache entries.

5. The method of claim 4, further comprising updating the allocated one or more active ERAT cache entries to indicate that the allocated one or more active ERAT cache entries are now free ERAT cache entries.

6. The method of claim 1, further comprising allocating, in response to determining that the total number of free ERAT cache entries is not less than or equal to the threshold number, a free ERAT cache entry to receive an ERAT translation.

7. The method of claim 1, wherein each ERAT cache entry includes a valid bit or invalid bit, wherein the valid bit indicates that the ERAT cache entry is one of an active ERAT cache entry or free ERAT cache entry, and the invalid bit indicates that the ERAT cache entry is the other of the active ERAT cache entry or the free ERAT cache entry.

8. The method of claim 1, further comprising providing a speculative checkin request for the allocated one or more active entries to the MMU, and receiving a checkin response from the MMU indicating the allocated one or more active entries are checked in.

9. The method of claim 1, wherein allocating the one or more active ERAT cache entries comprises randomly selecting the one or more active ERAT cache entries from all of the total active ERAT cache entries.

10. The method of claim 1, wherein the ERAT cache entries in the ERAT cache are divided into groups, and
wherein allocating the one or more active ERAT cache entries to be speculatively checked in to the MMU comprises, on a first search, searching a first group of ERAT cache entries and selecting one or more active ERAT cache entries randomly or that are recently used the least often, and on a second search, searching a second group of ERAT cache entries and selecting one or more active ERAT cache entries randomly or that are recently used the least often.

11. The method of claim 1, wherein allocating the one or more active ERAT cache entries comprises selecting one or more active ERAT cache entries that are recently used the least often.

12. A computer program product comprising:
one or more processors;
a non-transitory computer-readable storage medium having program instructions embodied therewith, the program instructions executable by the one or more processors, the program instructions including:
setting a threshold number of free Effective to Real Address Translation (ERAT) cache entries in an ERAT cache;
determining whether a total number of free ERAT cache entries is less than or equal to the threshold number of free ERAT cache entries;
allocating, in response to determining that the total number of free ERAT cache entries is less than or equal to the threshold number of free ERAT cache entries, one or more active ERAT cache entries to be speculatively checked in to a memory management unit (MMU); and
speculatively checking in the one or more active ERAT cache entries to the MMU.

13. The computer program product of claim 12, wherein determining whether a total number of free ERAT cache entries is less than or equal to the threshold number of free ERAT cache entries occurs in response to receiving a request for an Effective Address to Real Address translation.

14. The computer program product of claim 12, wherein determining whether a total number of free ERAT cache entries is less than or equal to the threshold number of free ERAT cache entries occurs in response to a number of active ERAT cache entries being equal to or greater than a predetermined threshold number of active ERAT cache entries.

15. The computer program product of claim 12, wherein the program instructions further includes allocating, in response to determining that the total number of free ERAT cache entries is not less than or equal to the threshold number of free ERAT cache entries, a free ERAT cache entry to receive an ERAT translation.

16. The computer program product of claim 12, wherein each ERAT cache entry includes a valid bit or invalid bit, wherein the valid bit indicates that the ERAT cache entry is one of an active ERAT cache entry or free ERAT cache entry, and the invalid bit indicates that the ERAT cache entry is the other of the active ERAT cache entry or the free ERAT cache entry.

17. The computer program product of claim 12, wherein the ERAT cache entries in the ERAT cache are divided into groups, and
wherein allocating the one or more active ERAT cache entries to be speculatively checked in to the MMU comprises, on a first search, searching a first group of ERAT cache entries and selecting one or more active ERAT cache entries randomly or that are recently used the least often, and on a second search, searching a second group of ERAT cache entries and selecting one or more active ERAT cache entries randomly or that are recently used the least often.

18. An information handling system comprising:
one or more processors having one or more acceleration units and one or more memory management units (MMU) wherein at least one acceleration unit has an Effective Address to Real Address Translation (ERAT) cache having a plurality of cache entries;
the one or more processors configured and adapted to:
set a threshold number of free ERAT cache entries in the ERAT cache;
determine whether a total number of free ERAT cache entries is less than or equal to the threshold number of free ERAT cache entries;
allocate, in response to determining that the total number of free ERAT cache entries is less than or equal to the threshold number of free ERAT cache entries, one or more active ERAT cache entries to be speculatively checked in to the one or more MMU; and
speculatively check in the one or more active ERAT cache entries to the one or more MMU.

19. The information handling system of claim 18, wherein the one or more processors is further configured and adapted to determine whether a total number of free ERAT cache entries is less than or equal to the threshold number of free ERAT cache entries in response to a number of active ERAT cache entries being equal to or greater than a predetermined threshold number of active ERAT cache entries.

20. The information handling system of claim 18, wherein the ERAT cache entries in the ERAT cache are divided into groups, and
wherein the one or more processors is further configured and adapted to allocate the one or more active ERAT cache entries to be speculatively checked in to the MMU comprises, on a first search, search a first group of ERAT cache entries and select one or more active ERAT cache entries randomly or that are recently used the least often, and on a second search, search a second group of ERAT cache entries and select one or more active ERAT cache entries randomly or that are recently used the least often.

\* \* \* \* \*